Dec. 15, 1925.  
M. E. NOYES  
1,565,586  
NUT CASTELLATING MACHINE  
Filed Aug. 13, 1923 5 Sheets-Sheet 1
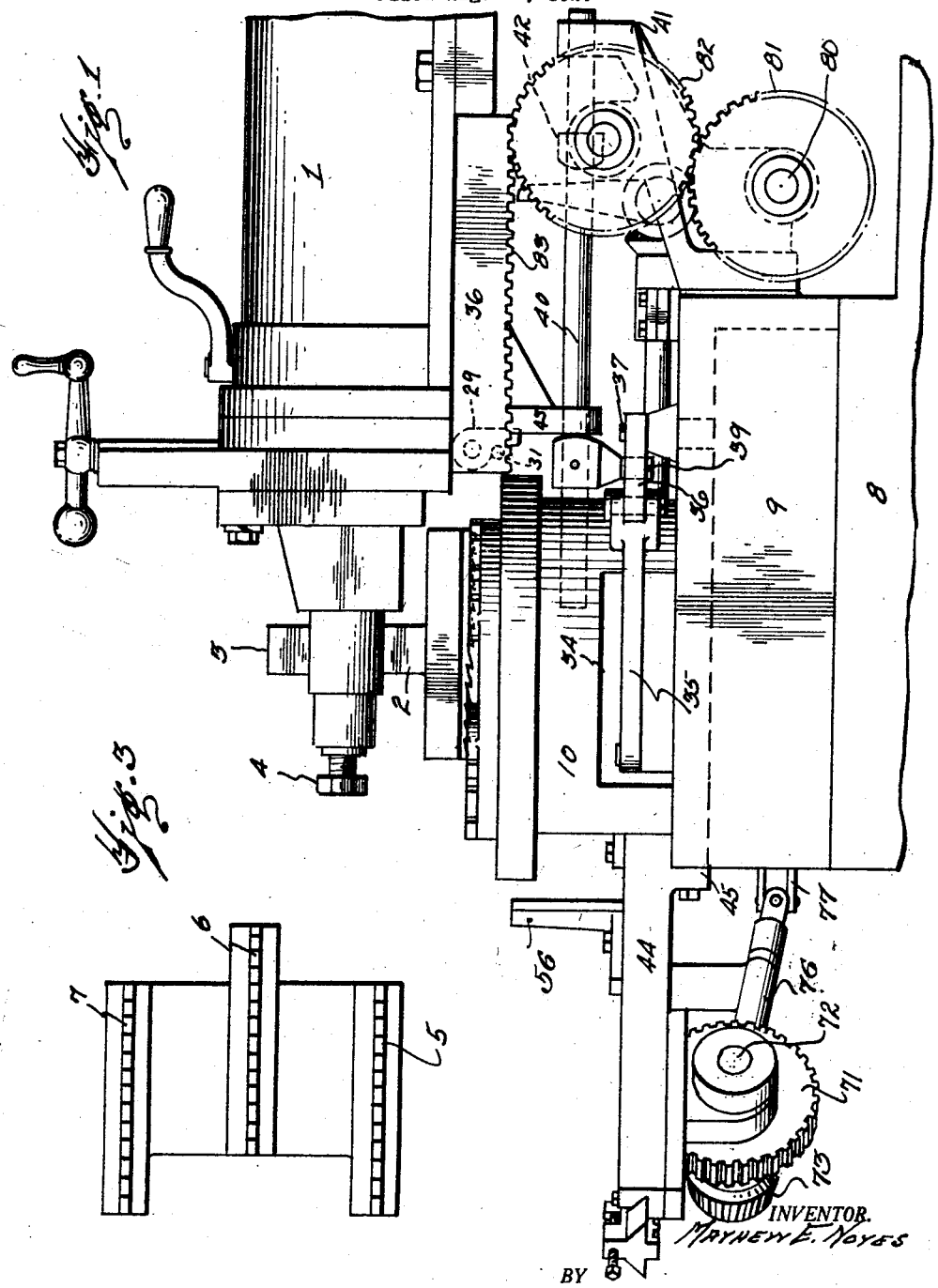
INVENTOR.
Mayhew E. Noyes
BY
ATTORNEY.

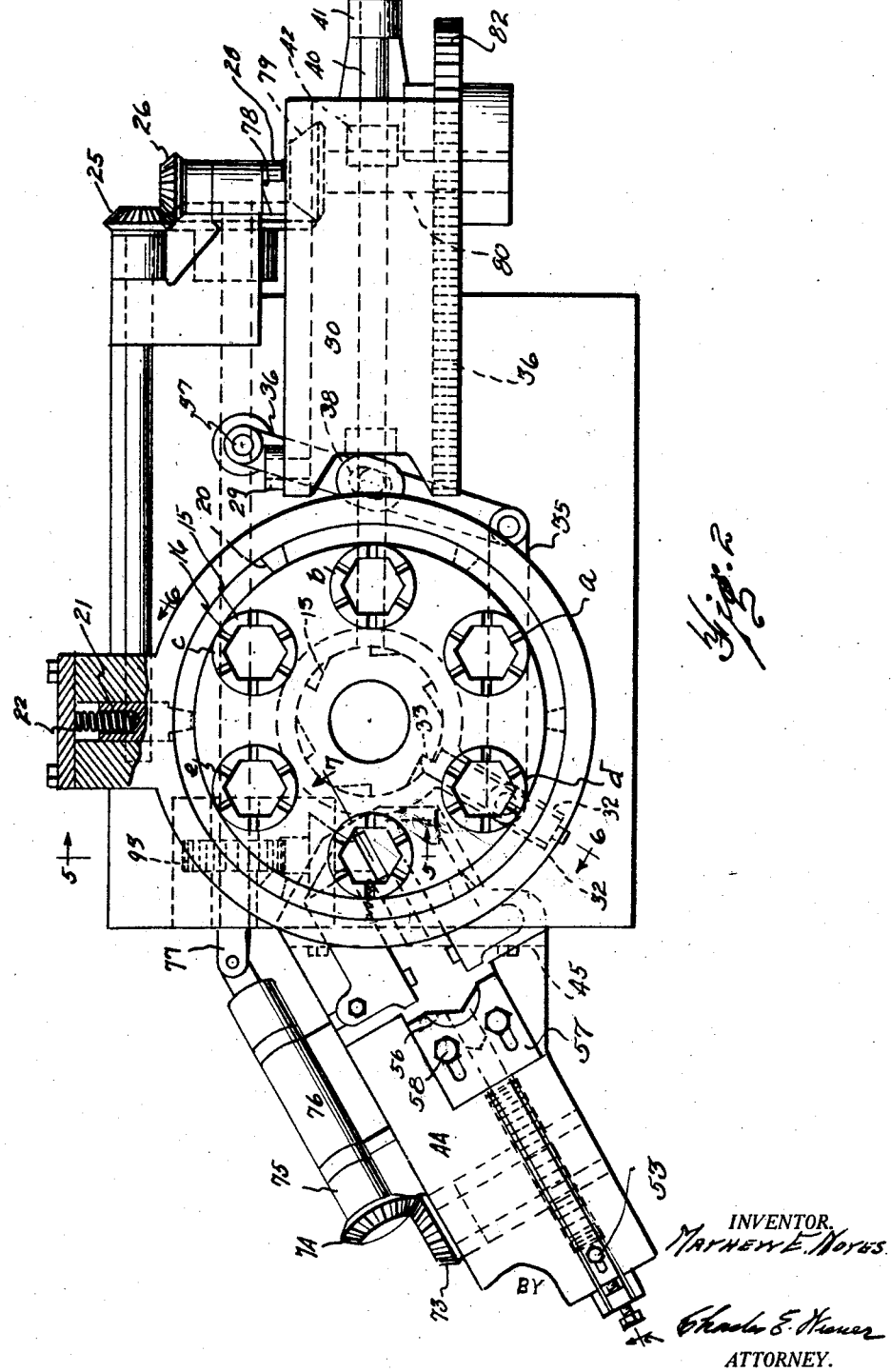

Dec. 15, 1925.
M. E. NOYES
1,565,586
NUT CASTELLATING MACHINE
Filed Aug. 13, 1923    5 Sheets-Sheet 3
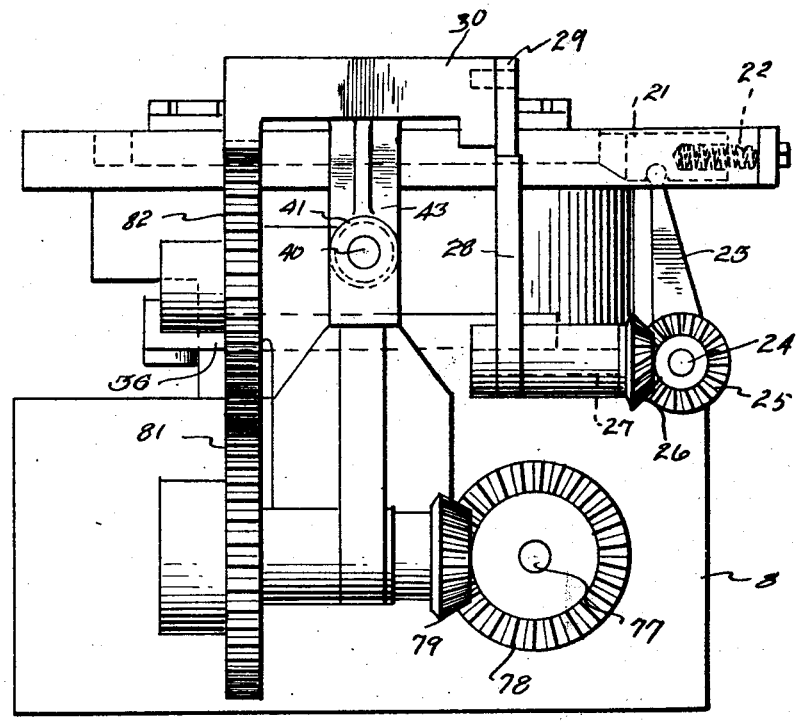
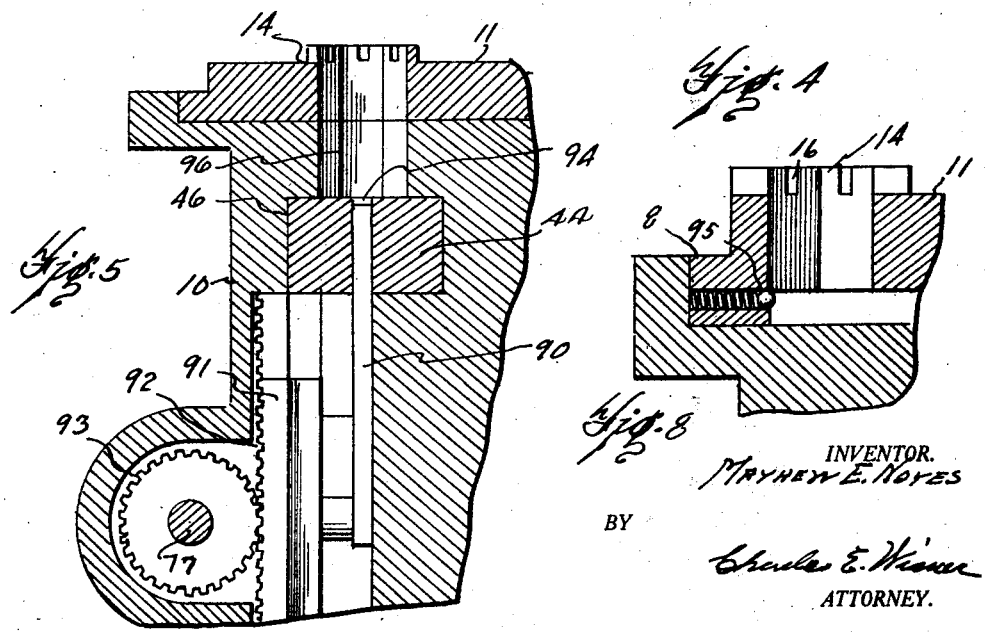
INVENTOR.
MAYHEW E. NOYES
BY
Charles E. Wiswer
ATTORNEY.

Dec. 15, 1925.

M. E. NOYES 1,565,586

NUT CASTELLATING MACHINE

Filed Aug. 13, 1923

INVENTOR.
Mayhew E. Noyes

BY

ATTORNEY.

Dec. 15, 1925.

M. E. NOYES 1,565,586

NUT CASTELLATING MACHINE

Filed Aug. 13, 1923   5 Sheets-Sheet 5

INVENTOR,
MAYHEW E. NOYES
BY
Charles E. Weimer
ATTORNEY.

Patented Dec. 15, 1925.

1,565,586

UNITED STATES PATENT OFFICE.

MAYHEW E. NOYES, OF MARION, OHIO.

NUT-CASTELLATING MACHINE.

Application filed August 13, 1923. Serial No. 657,160.

*To all whom it may concern:*

Be it known that I, MAYHEW E. NOYES, a citizen of the United States, residing at Marion, county of Marion, State of Ohio, have invented a certain new and useful Improvement in Nut-Castellating Machines, and declare the following to be a full, clear, and exact description of the same, such as will enable others skilled in the art to which it pertains to make and use the same, reference being had to the accompanying drawings, which form a part of this specification.

This invention relates to nut castellating machines, and the object is to provide a simple and practically automatic means for castellating nuts. It is further an object of the invention to provide nut castellating mechanism in which a reciprocating head carrying a cutter or broach is utilized and the parts so arranged that several nuts are operated upon at each stroke of the cutter so that in effect a nut is castellated at each stroke of the cutting device whereby speed of production is secured. A further object of the invention is in the provision of a holder for a plurality of nuts which by means of an automatic indexing device positions the nuts successively to the broach or cutter and so presents the nuts that, at each reciprocation of the cutter, the nuts are successively positioned at different angles to the cutter whereby the slots are properly formed in the end of a nut. Further features of the invention are involved in the adaptation of the parts to be automatically actuated through reciprocation of the cutter holder, in the mechanism controlled by such reciprocation to successively position nuts in the holder, and in various details of parts and their co-operative relationship as is hereinafter fully described and claimed. The preferred form of nut castellating device embodying my invention is shown in the accompanying drawings in which—

Fig. 1 is a side elevation of my improved nut castellating machine showing a reciprocating head carrying the cutter with which the remaining parts of the device co-operate.

Fig. 2 is a plan view of my improved device with the reciprocating head and cutter removed.

Fig. 3 is a plan view of the under side of the cutter.

Fig. 4 is an elevation taken from the right side of Fig. 1, the reciprocating head carrying the cutter being removed.

Fig. 5 is a section taken on line 5—5 of Fig. 2 showing the device for moving the nuts into the holder.

Fig. 8 is a detail showing the means for retaining the nut in the holder.

Figure 6:
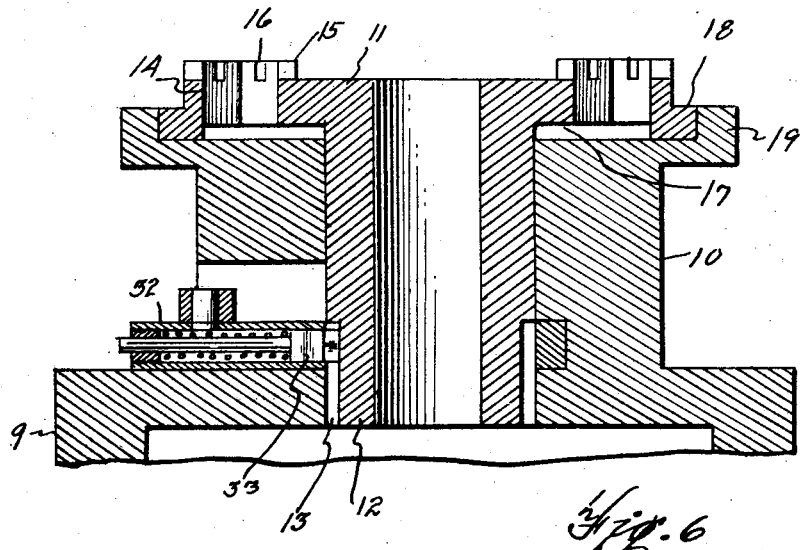
Fig. 6 is a section taken on line 6—6 of Fig. 2 showing part of the indexing mechanism and the nut holder.

This machine is adapted to operate and be controlled by a reciprocating head such as is used in shapers and may be employed with a shaper by mounting the bed of the castellating device on the table of the shaper. The invention, however, is not confined to use with any particular type of shaper and may be built in any approved way for use in conjunction with a reciprocating head. For the purpose of illustration of the invention, I have shown in Fig. 1 the usual reciprocating head 1 found in the ordinary shaper, this head carrying the various adjusting devices and means for securing a cutting tool thereto at the forward end. The tool for castellating the nuts is shown at 2 and is provided with a stem 3 secured in place at the forward end of the head by the usual means, including the binding bolt 4. The cutter is formed of three cutting blades 5, 6 and 7 shown in Fig. 3, and these blades are saw toothed in form as will be understood from dotted lines in Fig. 1, and the cutting face lies at an angle to the horizontal so that on reciprocable movement of the cutter the successive teeth cut into the nut to an increasing extent so that on a single forward cutting movement of the head a slot is formed in the nut to the desired depth as hereinafter described. The table on which the mechanism is mounted is indicated at 8 in Fig. 1. This table is fixedly positioned relative to the cutting head, and this table is mounted on the base 9 carrying the mechanism for placing the nuts in position and for indexing the holder and other co-operative parts hereinafter described. The holder 11 is mounted in a part 10 on the upper part of the base 9 shown in section in Fig. 6. The holder consists of a hub portion 12 having a series of notches or teeth 13 therein shown in dotted lines in Fig. 2 and is circular in form provided with six recesses 14 for the nuts. These recesses are of the same depth as the nut having upwardly extending flanges 15 of the same height as the castellated end of the nut and this flange 15 has slots or notches 16 cut in the upper face thereof shown clearly in Fig. 2. The successive slots are at an angle of sixty degrees one to the other and the slots are of a width to permit the broach or the cutters to pass therethrough in the cutting operation. This holder 11 is rotatable in the portion 10 of the base by an indexing mechanism hereinafter described, and the nuts that lie in the recesses 14 therefor rest on the upper surface 17 of the base which is recessed to receive the head 11. The head is provided with an external peripheral flange 18, the base part 10 being flanged at 19 therefor. It will be understood from Figs. 1 and 2 that the broach having the blades 5, 6 and 7 is reciprocable with the head 1, the cutters passing across the ends of the nuts in the slots or notches 16 provided in the flange 15 of the recesses, and that at one stroke of the head a groove is cut entirely across each of three nuts positioned in the three recesses at the right side of the head shown in Fig. 2. The cutters produce parallel cuts in the three nuts and, on withdrawal of the cutter, the head 11 is turned through an arc of sixty degrees bringing the recess $a$ with the nut therein to a position occupied by the recess $b$, the one at $b$ to position $c$ and the one at $d$ to position $a$. This presents the nuts in the three recesses then at the right side of Fig. 2 at a different angle to the cutters and a succeeding cut is made thereon so that in the passage of the nut from the position $a$ to the position $c$ three cuts have been made thereacross which completes the castellation thereof. In the succeeding turning of the head the nut $c$ passes to the left to the position $e$ and then by the next step to the position $f$ at which place the finished nut is forced from the recess. By use of the bladed broach or cutter, each stroke of the machine results in the castellation of a nut and at each stroke of the blades therefor a new nut must necessarily be introduced into the head as is hereinafter described. The flange of the head 11 is provided with a series of notches 20 indicated by dotted lines in Fig. 2 and on one side of the supporting flange 19 for the head I provide a spring-pressed pawl 21, the forward end of which is adapted to engage in a notch 20 of the rotatable head. This pawl, when in position, holds the head firmly for the cutting operation and at the completion of cutting movement the pawl is withdrawn and the head is turned. This pawl 21 is moved forward into the notch 20 by a spring 22 and is withdrawn from the notch by the mechanism indicated in Fig. 4, which mechanism consists of a lever 23 having a rounded end fitting a notch in the under side of the pawl 21. This lever is mounted on a shaft 24 extending along the back of the machine in bearings provided therefor and the shaft is provided with a beveled gear 25 which meshes with a similar gear 26 on a shaft 27 secured in bearings at a right angle thereto. Upon this shaft 27 is a lever 28 and a pivoted lever 29 is provided on the actuator 30 which is mounted as shown in Fig. 1 on the under side of the reciprocable head 1 and moves with the head. This pivoted lever 29 on backward movement of the head 1 at near the completion of the stroke, and as the broach is withdrawn from the notches 16 of the recesses, engages the end of the lever 28 rocking the shaft 27 toward the operator in Fig. 4 and thereby rocking the lever 28 to the right of Fig. 24 withdrawing the pawl 21. This is held from movement on its pivot in one direction by a pin indicated at 31 in Fig. 1. At the backward movement of the head this pivoted lever 29 overrides the end of the lever 28. For this reason the dog 29 is pivoted allowing it to draw back over the lever 28. Upon withdrawal of the pawl 21 from the notch 20 of the rotating head 11, the head is indexed and this indexing movement takes place just previous to completion of the backward stroke of the reciprocable head 1. The indexing device consists of a member 32 having a part encircling the hub 12 of the head 11 as shown in Fig. 6 and a hollow stem carrying a spring-pressed pawl 33 which engages the notches or teeth of the hub. It is to be understood that the member 10 has an opening 34 in the side thereof in which this stem may move and to the stem is pivoted a link 35 connected at its forward end to an end of the rock lever 36, the opposite end of which is pivoted on a pin 37 supported on the base 9. Intermediate the ends of the rock lever, as will be seen in Fig. 2, is provided an elongated aperture 38 in which rides the pin 39 having a hub secured on the shaft 40. This shaft is supported at one end in an aperture provided in the housing 10 for the head and at the opposite end by a bearing bracket 41 mounted on the rear end of the base 9. This shaft is reciprocable in the bearings and on the shaft is a collar 42 which is engaged by the arm 43 at about completion of the rearward movement of the head 1. This arm is carried on the base 30 as will be understood from Figs. 1 and 4 which, as previously stated, is secured directly to the under side of the traveling head 1. Thus, on rearward movement of the head, the part 43 strikes the collar 42, moves the rod 40 to the rear thereby drawing the ratchet arm 32 rearwardly a predetermined distance and turning the member 11 to bring the next tooth 13 in position to be engaged by the dog 33 on return movement which is caused by the forward or cutting movement of the head. On the rearward movement the first action is to cause the member 29 to engage the lever 28 and release the pawl 21 as previously stated. By the mechanism described the movement of the head is utilized to position the successive nuts for the castellating operation.

The nuts are passed to the head 11 and introduced into the recesses 14 therein by mechanism shown in Figs. 2, 5, 7 and 9. This consists of a plate or base 44 which is provided on the under side with a flange 45 by which it may be secured to the base 9. This plate has the forward end thereof beyond the flange 45 extending into an aperture 46 in the housing 10 as indicated in Fig. 5 and is provided with a way 50 formed therein for the slide 51. One side 50$^a$ of the way is removable and is secured in position by the cap screws 50$^b$. This slide carries an adjustable bar 52 secured thereto by means of a bolt 53 extending through a slot in the bar 52 and threaded in the slide. An adjusting screw 54 is utilized to position the forward end of the bar in the correct position relative to the nut to be introduced in the machine. This nut is indicated by dotted lines 55 in Fig. 9 and the nut placed in the machine in engagement with the upwardly extending guide finger 56, which guide finger is mounted on a plate 57 having slots therein for screws 58 to secure the same to the plate 44. The slots permit adjustment of the plate to accommodate different sizes of nuts, it requiring to be placed somewhat farther forward from the position Fig. 9 for the smaller sizes of nuts. The bar 52 engages the nut and moves it from the position shown at 55 in Fig. 9 forward to position shown by dotted lines 59 in Fig. 9. It is to be noted that two side plates 60 and 61 are provided, each of which has an adjustable forward end 62 and 63 respectively. This forward end in each instance has an inwardly extending lip 64 forming a stop for the nut in its forward movement by the bar 52. The parts 62 and 63 are adjustable on the members 60 and 61 respectively by means of the screws 65 extending through slots in the respective end members and into the member 60 and 61 respectively. These slots and screws permit adjustment of the end members 62 and 63 forward or backward longitudinally of the plate to accommodate different sizes of nuts. Also the plates 60 and 61 are adjustable transversely to increase or decrease the width of the slot between the plates in which the nut rides. These plates 60 and 61 are held by cap screws 66 and 67 respectively which extend through slots in the members 60 and 61 and into the plate 44. These plates 60 and 61 have ribs on the bottom engaging in grooves 68 and 69 which hold the members 60 and 61 in parallel relation and prevent displacement thereof. These adjustments of the members 56, 60, 61, 62 and 63 permit the parts to be positioned for the various sizes of nuts which this machine is capable of handling, and it is to be noted that if a change in the size of a nut is made and these parts adjusted therefor that a new head 11 must necessarily be used which has recesses of the proper size for the nuts to be operated upon. Thus, by adjustment of the parts mentioned and introduction of a corresponding member 11, this machine is adapted to castellate various sizes of nuts.

Figure 7:
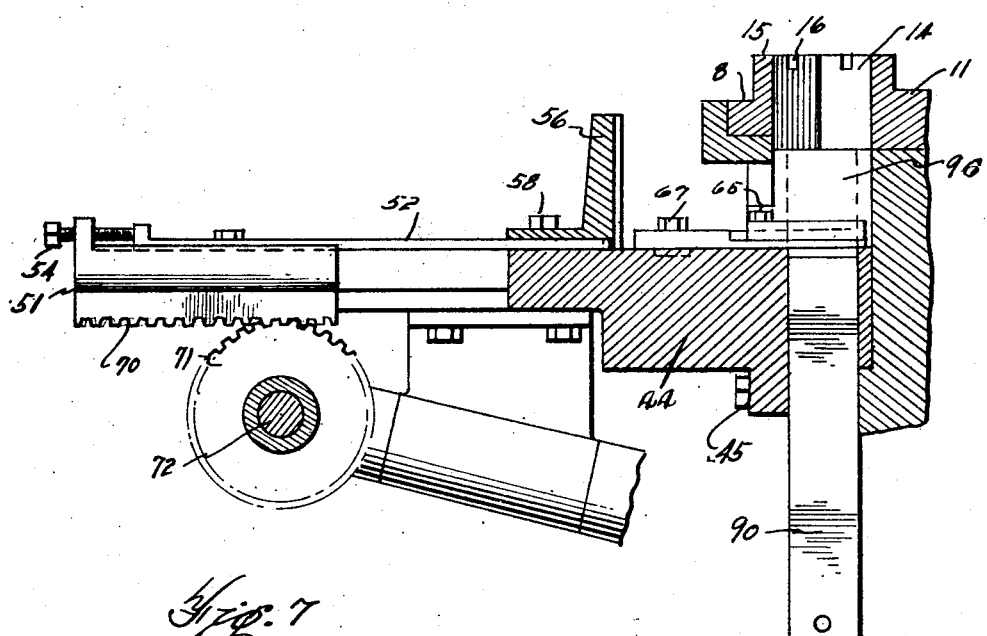
Fig. 7 is a section taken on line 7—7 of Fig. 2.
Figure 9:
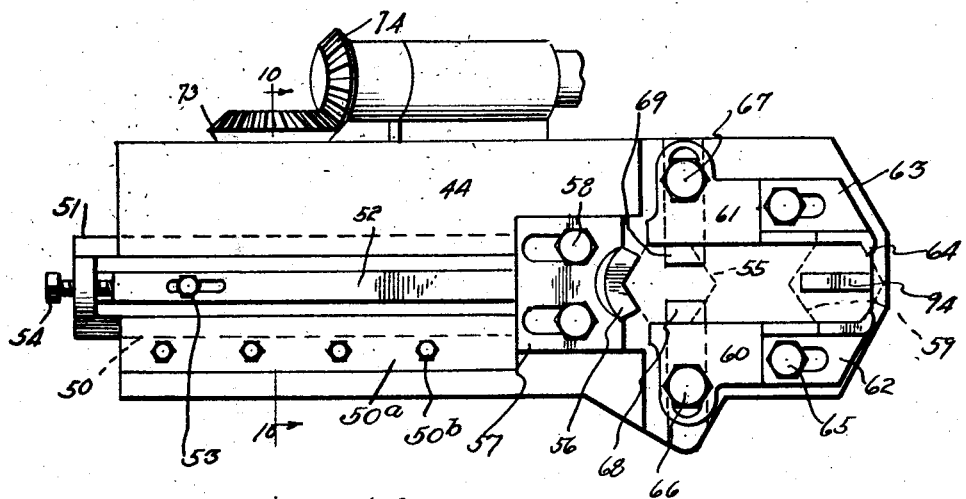
Fig. 9 is a plan view of the nut positioning mechanism.
Figure 10:
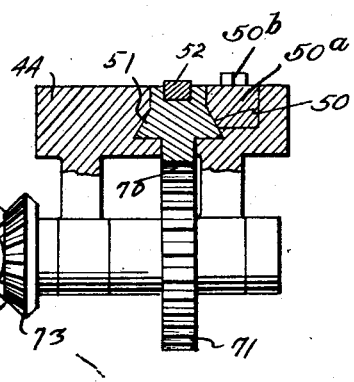
Fig. 10 is a section taken on line 10—10 of Fig. 9.

The slide 51 has rack teeth 70 formed on the lower side thereof as shown in Fig. 7 meshing with which is a gear 71 on a shaft 72 supported in bearings on the under side of the plate 44. This shaft 72 has a bevel gear 73 thereon meshing with a bevel gear 74 on a shaft 75 carried in a bearing 76 formed on one side of the member 44 as will be understood from Fig. 2. This shaft has a universal joint connection with a shaft 77 extending through the base of the machine. At the right end of the shaft, as shown in Fig. 2, is a bevel gear 78 meshing with a bevel pinion 79 on a shaft 80 supported at the rear of the base member 9 by the bracket 41. On this shaft 80 is a spur gear 81 meshing with a gear 82 also rotatably supported in bearings in the bracket 41. This gear 82 meshes with a rack 83 on the lower side of the member 30 as will be understood from Fig. 1. Thus, by reciprocation of the member 30 backward and forward, the slide 51 is made to reciprocate. As will be understood from Figs. 2, 5 and 7, I provide a vertically reciprocable bar 90 secured to a slide 91 riding in ways provided in the base 9. This slide has rack teeth 92 on the rear side thereof engaging a gear 93 on the shaft 77. Thus, turning of the shaft 77 in one direction and then in the other causes reciprocation of the slide member 91 and bar 90 attached thereto. This bar 90 rides in an aperture 94 provided in the forward end of the plate 44 directly beneath the position in which the nut is placed. As previously stated, this forward end extends into the base or housing 10 for the head 11 and the nut, as will be understood from Fig. 5, when in the position shown at 59 in Fig. 9 is directly beneath a recess 14 of the head 11. On upward movement of the bar 90 the nut will be moved upward into the recess 14 therefor forcing the finished nut therein out of the upper end of the recess. As indicated in Fig. 8 a spring-pressed ball 95 is provided at each recess 14 of the head 11 which, on movement of the nut upward, is forced backward into the recess and as the nut passes into the recess engages the side thereof with sufficient pressure to hold it in the recess preventing it following the member 90 on downward stroke. The nut when moved to the forward end of the plate 44 is moved upward through a recess 96 over which the recesses 14 of the head 11 are moved successively and after the nut has been moved upward into its respective recess 14 and the plate is turned, the nut then rests upon the base 17 as previously stated supporting the same from displacement by any pressure to which the nut is subjected in the cutting operation. The spring-pressed ball 95 is utilized merely to sustain the nut in its recess 14 when the bar 90 is withdrawn.

It will be understood that the relationship of the gears 82, 80, 79, 78, 74, 73 and 93 is such that on forward or cutting movement of the head 1, the bar 90 is moved upward by the gear 93 while the slide 51 is moved backward permitting a nut to be positioned forward of the guide finger and that on reverse movement of the head and member 30 the shaft 77 is rotated in an opposite direction moving the bar 90 downward and the slide 5 and bar 52 forward positioning a new nut over the end of the bar 90 which is practically in its lowermost position at the time the nut is finally positioned. This backward movement of the member 30 positions the nut over the bar 90 previous to the time the indexing pawl and connected parts are operated by the member 43 engaging the collar 42 which is accomplished at practically the completion of the backward movement. During the forward or cutting movement of the head the new nut is placed in the aperture therefor and at the completion of the forward movement the member 43 strikes the hub of the pin 39 moving the indexing pawl forward to a succeeding notch ready for reverse operation indexing the head 11 at the finish of the next rearward movement of the head 1. The parts thus work in unison, a nut being positioned in a recess on each forward movement of the traveling head and a finished nut taken therefrom, the blanks to be operated preferably placed by hand and the finished nuts removed likewise or in any approved manner, the indexing head positioning successive nuts to the broach as the head 11 is turned intermittently.

The mechanism for a machine for the purpose stated is comparatively simple; is automatic in operation, it only being necessary for the operator to place the blank nuts to be operated upon and remove the finished nuts from the machine. Further, the machine is extremely rapid in operation as each stroke of the machine cuts a single slot across three individual nuts due to the manner of presentation of the nuts and to the fact of this form of broach or cutter having teeth the successive points of which lie at an angle to the direction of movement of the cutter so that each tooth takes a fine cut and successive teeth continue the depth of the cut to the necessary point.

Having thus fully described my invention, its utility and mode of operation, what I claim is—

1. In a machine for castellating nuts, the combination with a reciprocable head, of a cutter carried by the head having a blade of a character to cut a slot in the end of a nut, a holder having a series of recesses arranged in a circle each adapted to receive a nut, and means for indexing the holder to bring successive nuts to position for the cutting operation.

2. In a machine for castellating nuts, the combination with a reciprocable head, of a cutter having three blades in parallel relation, each of a character to cut a slot in the end of a nut, a holder having a series of apertures arranged in a circle, each adapted to hold a nut, the cutter blades being spaced to engage three nuts on each cutting movement, and means for indexing the holder to move through an arc of sixty degrees at each movement whereby each nut is presented successively to the three cutter blades.

3. In a machine for castellating nuts, the combination with a reciprocable head, of the cutter having three blades in spaced relation parallel with the direction of movement of the head, a holder carrying a series of nuts arranged in a circle, the radial lines passing through the centers thereof being sixty degrees apart, the cutter blades being adapted to engage three nuts at each cutting movement, and means for indexing the holder through an arc of sixty degrees at each movement of the reciprocable head.

4. In a machine for castellating nuts, the combination with a reciprocable cutter having three blades in spaced relation parallel to the direction of movement thereof, a holder for maintaining a series of nuts in a circle, radial lines passing through the center thereof being sixty degrees apart, means for indexing the holder at each complete stroke of the cutter through an arc of sixty degrees thereby presenting each nut successively to the blades whereby the cuts made thereacross are at an angle of sixty degrees one to the other, and automatic mechanism for positioning blanks in succession to the holder and removing a finished nut therefrom.

5. In a machine for castellating nuts, the combination with a reciprocable holder, of a cutter having three blades arranged parallel with the direction of movement of the head, a holder for a series of nuts arranged in a circle at an angle of sixty degrees one to the other, the said blades being spaced to engage three consecutive nuts, indexing mechanism for turning the holder through an arc of sixty degrees to present the nuts successively to the cutter blades, means for operating the indexing mechanism controlled through movement of the head, and means for presenting blanks successively to the holder operated by movement of the head in timed relation with the indexing mechanism.

6. In a machine for castellating nuts, a cutter reciprocable across the end of the nut to cut a slot therein to an increasing depth as the cutter moves, a holder for a series of nuts adapted to be turned to present successive nuts to the blade, means for supplying nuts successively to the holder and removing finished nuts therefrom, and automatic means for indexing the head between successive movements of the cutter.

7. In a machine for castellating nuts, a reciprocable head, a cutter having three blades parallel to the direction of movement of the head, a holder having a series of recesses for nuts so arranged that three of the nuts are engaged by the cutter at each cutting movement, a housing for the holder having a single recess with which the nut recesses of the holder successively register, automatic mechanism for feeding blanks successively to the recess of the housing and subsequently moving the nut from the recess of the housing to the recess of the holder, a radial line passing through the axis of rotation of the holder and the centers of the recesses being at an angle of sixty degrees, means for indexing the holder through an arc of sixty degrees at each movement of the reciprocable head whereby a nut in passing from cutting position for one blade to that of the next is turned through an arc of sixty degrees, means for securing the holder from rotation during the cutting movement and releasing the same previous to the indexing movement, the said nut presenting, indexing and securing means being automatically operable through movement of the traveling head.

8. In a machine for castellating nuts, a reciprocable head, a three-bladed cutter carried thereby, the blades being in spaced relation parallel with the direction of movement of the head and each adapted to make a cut of increasing depth as it is moved across the respective nut, a holder having a series of recesses arranged in a circle at an angle of sixty degrees, the blades being arranged to engage three of the nuts at each cutting movement, an indexing device for turning the holder through an arc of sixty degrees at each complete stroke of the cutter, a housing for the holder having an aperture with which the nut recesses of the holder register successively, means for presenting a nut in the housing aperture, and means operating in timed relation therewith for moving the same into the recess of the holder, a retainer in each recess for holding the nut moved thereinto, the said movement of the nut into the recess discharging the finished nut therefrom.

9. In a nut castellating machine, a traveling head, a stationary table, a cutter carried by the head having three blades in spaced relation parallel with the direction of movement of the head, mechanism for handling the nuts comprising a base mounted on the table, a holder for nuts rotatably mounted in the base, said holder having a series of recesses arranged in a circle, successive recesses being at an angle of sixty degrees apart and the blades being arranged to engage three adjacent nuts in the recesses, mechanism carried by the base for indexing the holder comprising a pawl engaging a toothed part of the holder, means carried by the head for moving the pawl and turning the holder through an arc of sixty degrees subsequent to the cutting movement of the head, and mechanism operable by movement of the head for presenting a nut to a recess of the holder during the cutting movement of the head.

In testimony whereof, I sign this specification.

MAYHEW E. NOYES.